United States Patent
Piet et al.

(10) Patent No.: US 9,868,644 B2
(45) Date of Patent: *Jan. 16, 2018

(54) PROCESS FOR THE JOINT PRODUCTION OF SODIUM CARBONATE AND SODIUM BICARBONATE

(71) Applicant: SOLVAY SA, Brussels (BE)

(72) Inventors: Joffrey Piet, Torrelavega (ES); Frederic Nicolas, Haraucourt (FR)

(73) Assignee: Solvay SA, Brussels (BE)

( * ) Notice: Subject to any disclaimer, the term of this patent is extended or adjusted under 35 U.S.C. 154(b) by 314 days.

This patent is subject to a terminal disclaimer.

(21) Appl. No.: 14/367,737

(22) PCT Filed: Dec. 19, 2012

(86) PCT No.: PCT/EP2012/076222
§ 371 (c)(1),
(2) Date: Jun. 20, 2014

(87) PCT Pub. No.: WO2013/092754
PCT Pub. Date: Jun. 27, 2013

(65) Prior Publication Data
US 2015/0037583 A1  Feb. 5, 2015

(30) Foreign Application Priority Data
Dec. 23, 2011 (EP) ..................... 11195697

(51) Int. Cl.
| C01D 7/00 | (2006.01) |
| C01D 7/12 | (2006.01) |
| C01D 7/22 | (2006.01) |
| C01D 7/24 | (2006.01) |
| C01D 7/26 | (2006.01) |
| C01D 7/32 | (2006.01) |
| C01D 7/40 | (2006.01) |

(52) U.S. Cl.
CPC ............... C01D 7/126 (2013.01); C01D 7/00 (2013.01); C01D 7/22 (2013.01); C01D 7/24 (2013.01); C01D 7/26 (2013.01); C01D 7/32 (2013.01); C01D 7/40 (2013.01); Y10T 428/2982 (2015.01)

(58) Field of Classification Search
CPC . C01D 7/126; C01D 7/22; C01D 7/26; C01D 7/32; C01D 7/40; C01D 7/24
USPC .................. 423/194, 184, 202, 208; 428/402
See application file for complete search history.

(56) References Cited

U.S. PATENT DOCUMENTS

| 3,028,215 A * | 4/1962 | Frint ..................... C01B 25/412 |
| | | 23/302 T |
| 3,072,466 A | 1/1963 | Bauer et al. |
| 3,264,057 A | 8/1966 | Miller |
| 3,852,427 A | 12/1974 | Hoffmann et al. |
| 4,238,305 A | 12/1980 | Gancy et al. |
| 4,478,599 A | 10/1984 | Puri et al. |
| 4,584,077 A | 4/1986 | Chlanda et al. |
| 4,636,289 A | 1/1987 | Mani et al. |
| 4,654,204 A | 3/1987 | Copenhafer et al. |
| 5,043,149 A * | 8/1991 | Frint ..................... C01D 7/126 |
| | | 23/302 T |
| 5,624,647 A | 4/1997 | Zolotoochin et al. |
| 5,736,113 A | 4/1998 | Hazen et al. |
| 6,010,672 A | 1/2000 | Turner |
| 6,042,622 A | 3/2000 | Larsen |

(Continued)

FOREIGN PATENT DOCUMENTS

| CA | 2009616 A1 | 8/1991 |
| EP | 0439636 A1 | 8/1991 |

(Continued)

OTHER PUBLICATIONS

U.S. Appl. No. 12/305,444, Detournay et al, filed Dec. 18, 2008, WO 2008/003787.

(Continued)

Primary Examiner — Steven Bos
(74) Attorney, Agent, or Firm — Beatrice C. Ortego

(57) ABSTRACT

Process for producing sodium carbonate and sodium bicarbonate in a continuous mode out of trona comprising: c) feeding crushed trona, an extraction water and an additive in a first leaching tank containing a dissolution solution comprising sodium carbonate and sodium bicarbonate, wherein the additive is selected from the group consisting of: anionic hexametaphosphate, anionic polyphosphate, anionic polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers and combinations thereof; d) dissolving at least partially the crushed trona in the dissolution solution in order to produce a first suspension; e) removing continuously the first suspension from the first leaching tank and feeding it with an additive into a second leaching tank wherein the additive is selected from the same group of additives of step c); f) dissolving at least partially the remaining crushed trona from step d) in the second leaching tank in order to produce a second suspension; g) separating the second solid particles from the second solution to produce a production solution comprising sodium carbonate and to produce a production solid comprising the second solid particles comprising sodium bicarbonate.

21 Claims, No Drawings

(56) References Cited

U.S. PATENT DOCUMENTS

| | | | |
|---|---|---|---|
| 6,221,225 B1 | 4/2001 | Mani | |
| 6,660,049 B1 | 12/2003 | Day | |
| 8,865,096 B2 * | 10/2014 | Breton | C01D 7/00 23/302 T |
| 2003/0017099 A1 | 1/2003 | Kurtz | |
| 2003/0155244 A1 | 8/2003 | Mischi et al. | |
| 2009/0291038 A1 | 11/2009 | Davoine et al. | |

FOREIGN PATENT DOCUMENTS

| | | |
|---|---|---|
| EP | 1876145 A1 | 1/2008 |
| EP | 2399866 A1 | 12/2011 |
| GB | 2106488 A | 4/1983 |
| JP | 48017160 B | 5/1973 |
| JP | 05339005 A | 12/1993 |
| WO | WO 01/79335 A1 | 10/2001 |
| WO | WO 2006/053873 A1 | 5/2006 |
| WO | WO 2008/003787 A1 | 1/2008 |
| WO | WO 2009/087145 A1 | 7/2009 |
| WO | WO 2009/087149 A1 | 7/2009 |
| WO | WO 2010/072793 A1 | 7/2010 |
| WO | WO 2011/161120 A1 | 12/2011 |
| WO | WO 2013/092650 A1 | 6/2013 |
| WO | WO2014/207120 A2 | 12/2015 |
| WO | WO2014/207123 A2 | 12/2015 |
| WO | WO2014/207124 A2 | 12/2015 |

OTHER PUBLICATIONS

U.S. Appl. No. 12/811,663, Detournay et al, filed Jul. 2, 2010, WO 2009/087149.
U.S. Appl. No. 12/811,643, Detournay et al, filed Jul. 2, 2010, WO 2009/087145.
U.S. Appl. No. 13/139,430, Detournay et al, filed Jun. 13, 2011, WO 2010/072793.
U.S. Appl. No. 13/805,005, Breton et al., filed Dec. 18, 2012, WO 2011/161120.
Ma, S., et al—"Study on crystallization kinetics of NaHCO3 in a new type of carbonation column and the effect of additive on the crystallization kinetics", 1996, Journal of Beijing University of Chemical Technology, vol. 23, Issue No. 3, pp. 6-13, Beijing Huagong Daxue Xuebao Bianjibu. Dept. Chem. Eng., Beijing Univ. Chem. Eng., Beijing, 100029, Peop. Rep. China; 9 pgs. Includes abstract in English.
U.S. Appl. No. 14/365,121, Thoi-Dai Chau et al., filed Jun. 13, 2013, WO2013/092650.
U.S. Appl. No. 14/900,514, Savary, filed Dec. 21, 2015, WO2014/207120.
U.S. Appl. No. 14/900,524, Savary, filed Dec. 21, 2015, WO2014/207123.
U.S. Appl. No. 14/900,533, Savary, filed Dec. 21, 2015, WO2014/207124.

\* cited by examiner

PROCESS FOR THE JOINT PRODUCTION OF SODIUM CARBONATE AND SODIUM BICARBONATE

CROSS-REFERENCE TO RELATED APPLICATIONS

This application is a U.S. national stage entry under 35 U.S.C. §371 of International Application No. PCT/EP2012/076222 filed Dec. 19, 2012, which claims priority to European application No. 11195697.5 filed on Dec. 23, 2011, the whole content of this application being incorporated herein by reference for all purposes.

TECHNICAL FIELD

This invention relates to a method for the joint production of sodium carbonate and sodium bicarbonate out of trona ore, and is an improvement of the process described in WO-EP2011/060378 patent application (Solvay SA).

BACKGROUND OF THE INVENTION

Trona ore is a mineral comprising sodium sesquicarbonate ($Na_2CO_3.NaHCO_3.2H_2O$). It is found in a number of deposits around the world, i.e. in USA, Brazil, China, Egypt, Kenya, India, Tanzania, Turkey. A vast deposit of mineral trona is found in southwestern Wyoming (USA) near Green River. This deposit includes beds of trona and mixed trona and halite (rock salt or NaCl) which covers approximately 2,600 km². The major trona beds range in size from less than 428 km² to at least 1,870 km². By conservative estimates, these major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate finds major use in the glass-making industry and for the production of baking soda, detergents and paper products.

A common method to produce sodium carbonate from trona ore is known as the "monohydrate process". In that process, crushed trona ore is calcined into crude sodium carbonate which is then dissolved in water. The trona insolubles are removed, and the resulting water solution is purified and fed to a crystallizer where pure sodium carbonate monohydrate crystals are crystallized. The monohydrate crystals are separated from the mother liquor and then dried into anhydrous sodium carbonate. However, the soluble impurities contained in the trona ore, tend to accumulate into the crystallizer. To avoid build up of impurities, the mother liquor must be purged. The purge liquor, which represents important quantities for industrial monohydrate plants, is commonly sent to evaporative ponds.

On the other side, sodium bicarbonate is a product with a wide range of interesting properties and a very wide range of applications from the pharmaceutical industry to the human food and animal feed, and to the use in flue gas treatment. In flue gas treatment sodium bicarbonate is most likely among the most efficient chemicals for the removal of a wide range of pollutants (most notably the acidic one), and its use is limited only by the competition of less efficient but much cheaper chemicals such as lime or even limestone.

The production of sodium bicarbonate is currently almost entirely made by the carbonation of sodium carbonate. The carbonation may be made with $CO_2$ from lime kilns or calciners; it can also be done with geological $CO_2$.

Because of the nature of this most important process for the bicarbonate production, the price for bicarbonate is above the price of the soda ash. With such economics the uses of bicarbonate will always be limited by the competition of cheaper substitutes, most notably in the flue gas treatment.

WO 2010072793 (Solvay SA) the content of which is incorporated by reference discloses a process for the joint production of sodium carbonate and sodium bicarbonate using selective dissolution of sodium carbonate while recrystallizing in the same step crude sodium bicarbonate particles comprising the trona insolubles. The process can be operated either in a batch (discontinuous) mode or in a continuous mode. On continuous mode, one or two leaching tanks in series are operated with 15 to 40 minutes mean residence time in each tank. Though the produced crude sodium bicarbonate is fine with mean diameter solid particles size from 7 to 30 μm.

U.S. Pat. No. 4,654,204 discloses a process for the continuous production of purified sodium bicarbonate by introducing solid sodium carbonate ($Na_2CO_3$), sodium sesquicarbonate ($Na_2CO_3.NaHCO_3.2H_2O$), and/or Wegscheider's salt ($Na_2CO_3.3NaHCO_3$) into a reversion slurry. In that process the sodium carbonate from the reversion liquor is bicarbonated with carbonic acid ($CO_2$) in a carbonator and recycled to the reversion slurry to form sodium bicarbonate from fed sodium carbonate. The document is silent on insoluble impurities of the solid feed.

U.S. Pat. No. 4,478,599 discloses a process for continuously controlling the formation of crystal fines in a continuous process for crystallizing sodium bicarbonate, using carbon dioxide gas and a feeding brine by adding a flocculant polymers or copolymers in the mother liquor before the crystallization of sodium bicarbonate. In one of the described process (FIG. 2) using a multi-stage process with a first carbonator zone using CO2 crystallizing sodium bicarbonate, and a second stage crystallizing zone in a cooled reactor, the document teaches that the flocculent is to be added prior to the reception of the mother liquor before the second crystallization stage, as if the flocculant were to be added to the mother liquor in the second crystallization stage then fines will have already formed to such extent that fines control cannot be achieved. The sodium bicarbonate crystallization is operated either with an evaporative crystallizer, or with a cooling crystallizer, or by bicarbonation of the feeding brine with carbon dioxide gas. In this process the raw materials are either in liquid or gas form. The document is silent on a selective dissolution of sodium carbonate from trona and the reversion crystallization of sodium sesquicarbonate into bicarbonate.

U.S. Pat. No. 3,852,427 discloses a process for making sodium bicarbonate spherulites from sodium sesquicarbonate comprising preparing an aqueous solution of sodium sesquicarbonate totally dissolved, introducing an alkali metal phosphate in the aqueous solution, carbonating in batch mode the solution with carbon dioxide and cooling gradually the slurry while continuing the carbonation to obtain the spherulites.

The invention aims at producing bicarbonate from trona in a continuous mode in a smooth and inexpensive way, with an improved process for obtaining coarse sodium bicarbonate crystals and at the same time valorizing the sodium carbonate contained in the trona without the use of total dissolution of trona which uses water that will have to be removed, for instance by evaporation, with the associated energy costs and $CO_2$ foot-print when using fossil energy raw material.

SUMMARY OF THE INVENTION

The present invention relates to a process for producing sodium carbonate and sodium bicarbonate in a continuous mode out of trona, using a selective dissolution of sodium carbonate out of trona and a reversion crystallization of the trona into sodium bicarbonate. It has been surprisingly observed that when using crystallization habit modifiers (hereinafter called "additives"), known in prior art to enlarge crystals of sodium bicarbonate in specific processes, and used on continuous mode in one or two leaching tanks in series (or cascade) for direct dissolution of carbonate from trona with reversion of solid trona into crude sodium bicarbonate, the particles size of the obtained crude bicarbonate is very fine and difficult to separate from its mother solution. Moreover the obtained very fine product is heavily impregnated with aqueous mother liquor and therefore is costly to dry. However it has been observed that using specific staged addition of the additives in each of the reactors in specific operating conditions, enables to enlarge considerably the particle size of the crude sodium bicarbonate from trona and therefore to improve considerably the separations steps and drying steps.

Consequently the process of present invention relates to a process for producing sodium carbonate and sodium bicarbonate in a continuous mode out of trona which comprises the following steps:

c. Feeding crushed trona, an extraction water and an additive in a first leaching tank containing a dissolution solution comprising sodium carbonate and sodium bicarbonate, saturated or super-saturated in sodium bicarbonate wherein the additive is selected from the group consisting of: anionic hexametaphosphate, anionic polyphosphate, anionic polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers and combinations thereof;

d. Dissolving at least partially the crushed trona in the dissolution solution in order to produce a first suspension comprising solid particles comprising sodium bicarbonate and a first solution comprising sodium carbonate;

e. Removing continuously the first suspension from the first leaching tank to obtain a removed first suspension and feeding the removed first suspension and an additive into a second leaching tank wherein the additive is selected from the same group of additives of step c), preferably the additive is the same additive as the one used in step c);

f. Dissolving at least partially the remaining crushed trona from step d) in the dissolution solution present in the second leaching tank in order to produce a second suspension comprising second solid particles comprising sodium bicarbonate and a second solution comprising sodium carbonate;

g. Separating the second solid particles from the second solution to produce a production solution comprising sodium carbonate and to produce a production solid comprising the second solid particles, said second solid particles comprising sodium bicarbonate.

A first advantage of the process according to the invention is the selective dissolution of sodium carbonate from the trona, enabling the separate valorization of the sodium carbonate and sodium bicarbonate parts of the trona, containing sodium sesquicarbonate, without the need of complete dissolution of the ore before processing clear solutions into sodium carbonate and sodium bicarbonate. Thereby this reduces amounts of processing water to be further evaporated.

A second advantage of the process according to the present invention is that it avoids calcining trona into raw sodium carbonate and $CO_2$ to produce sodium bicarbonate and valuable sodium carbonate therefore saving energy consumption and reducing $CO_2$ flue gas emissions per tons of sodium carbonate and bicarbonate produced.

A third advantage of the process according to the present invention is that the $CO_2$ content of the produced sodium bicarbonate is coming directly from the ore and does not need to be supplied from an outer source or recovered from existing soda ash plant.

A fourth advantage of the process according to the present invention is that the present method operated continuously generates big particle sizes of the solid particles which are synthesized in the leaching tanks, comprising sodium bicarbonate as the use of taught technology of prior art leads to fine particles difficult to separate from their mother liquor and expensive to dry.

A fifth advantage of the process according to the present invention is that the synthesized solid particles, when generated from impure trona, is particularly suitable for treatment of a flue gas containing acid components: such solid particles inhibit the formation of incrustation in mills before being introduced into the flue gas. Specific pollutants of flue gases such as fluorhydric acid are effectively neutralized with such solid particles comprising insoluble impurities in combination with sodium bicarbonate.

A sixth advantage of the process according to the present invention is that it can be easily coupled with a sodium carbonate monohydrate process using calcined trona (crude soda ash) to saturate the produced sodium carbonate of the present process before purifying the solution from calcined trona insolubles and from dissolved sodium bicarbonate with caustic and then, crystallizing the sodium carbonate in a monohydrate evaporator crystallizer; or, optionally, coupling the process of present invention with an electrodialysis process to either debicarbonate part of the production solution and further transform it in valuable sodium carbonate, though limiting the $CO_2$ emission per ton of soda ash produced from Trona, or to transform part of the production solution in one enriched solution in sodium bicarbonate for further production of solid sodium bicarbonate and in a second co-produced solution comprising caustic soda for further use in sodium carbonate production.

DESCRIPTION OF THE PREFERRED EMBODIMENTS

The following description illustrates embodiments of the present invention by way of example and not necessarily by way of limitation.

It should be noted that any feature described with respect to one aspect or one embodiment is interchangeable with another aspect or embodiment unless otherwise stated.

The process of present invention relates to a process for producing sodium carbonate and sodium bicarbonate in a continuous mode out of trona which comprises the following steps:

c. Feeding crushed trona, an extraction water and an additive in a first leaching tank containing a dissolution solution comprising sodium carbonate and sodium bicarbonate, saturated or super-saturated in sodium bicarbonate wherein the additive is selected from the group consisting of: anionic hexametaphosphate, anionic polyphosphate, anionic polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers and combinations thereof;

d. Dissolving at least partially the crushed trona in the dissolution solution in order to produce a first suspension comprising solid particles comprising sodium bicarbonate and a first solution comprising sodium carbonate;

e. Removing continuously the first suspension from the first leaching tank to obtain a removed first suspension and feeding the removed first suspension and an additive into a second leaching tank wherein the additive is selected from the same group of additives of step c), preferably the additive is the same additive as the one used in step c);

f. Dissolving at least partially the remaining crushed trona from step d) in the dissolution solution present in the second leaching tank in order to produce a second suspension comprising second solid particles comprising sodium bicarbonate and a second solution comprising sodium carbonate;

g. Separating the second solid particles from the second solution to produce a production solution comprising sodium carbonate and to produce a production solid comprising the second solid particles, said second solid particles comprising sodium bicarbonate.

In present invention trona contains generally at least about 10% by weight of sodium sesquicarbonate, preferably at least about 50%, more preferably at least about 80% of sodium sesquicarbonate. Trona contains generally at most about 99.9% by weight of sodium sesquicarbonate, more generally at most about 95% by weight of sodium sesquicarbonate. The process produces solid particles having a high content in sodium bicarbonate.

The process according to the invention is operated in a continuous mode, as described in patent application WO2010072793 incorporated by reference in present description.

When the process is operated in a continuous mode, the composition of the leaching tanks suspensions are more or less stationary and are of the same composition of the removed suspensions considering each tank. In a preferred mode of present invention at least two leaching tanks are organized in series (cascade) which operates as follows. Extraction water and trona ore are continuously added to a first leaching tank with part of the additives. The outflow of the first leaching tank (production solution and solid particles) is introduced into the second leaching tank along with a second part of additives. More leaching tanks can also be used in series after the second one. Therefore also using additives in each of the subsequent tanks, preferably in decreased amounts. Such a use of two or more leaching tanks in series enables a better residence time distribution of the trona ore within the production solution. This improves the dissolution of trona and the corresponding selective dissolution of sodium carbonate as it enables to all particle size of the crushed trona to have sufficient time to dissolve the sodium carbonate part of the ore. This improves also the solid particles production with a higher content in sodium bicarbonate.

The expression continuous mode is understood to mean also a mode of realization of the present process wherein the trona ore, the extraction water, the additive and the leaching tank suspensions are continuously or quasi-continuously introduced or removed.

The continuous or quasi-continuous removing of the suspensions from the leaching tanks can be carried out with any suitable means such as, for instance, with centrifugal pumps or peristaltic pumps for a continuous withdrawal or with gravitational draining controlled sequentially by means of electric or pneumatic valves for a quasi-continuous withdrawal. The expression quasi-continuous introduction or withdrawal is understood to mean an introduction or withdrawal of solution, reactants, or products of reaction that, although non continuous in a strict sense, enable the same function, as for instance sequential introductions or sequential removals in which the quantities of solution, additives, or suspensions are small compared to the total quantity contained in the leaching tanks. Such as for instance one tenth or one fiftieth of the total quantity contained in the leaching tanks.

In the present invention the mean residence time of the first suspension in the first leaching tank is generally at least 10 seconds, preferably at least 1 minute, more preferably at least 2 minutes. It is advantageously at most 30 minutes, more advantageously at most 15 minutes, even more advantageously at most 10 minutes. One should understood as mean residence time of the suspension in a tank as the mean time obtained by dividing the useful volume of the tank by the mean withdrawal flow of the corresponding tank. It has been observed that when the first leaching tank is operated with long mean residence time uncontrolled crystallization occurs with the generation of very fine production particles.

The mean residence time in the second leaching tank or subsequent tanks may be longer to enable a correct dissolution of the sodium carbonate from trona crushed particles. In present invention the mean residence time of the second suspension (or subsequent suspensions) in the second leaching tank (or respectively in the subsequent tanks) is(are) generally at least 5 minutes, preferably at least 10 minutes, more preferably at least 15 minutes. It is generally at most 2 hours, advantageously at most 1 hour, more advantageously at most 40 minutes.

In the present invention, the additive is advantageously chosen from the group consisting of: anionic hexametaphosphate, anionic polyphosphate, anionic polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers and combinations thereof, preferably in sodium or ammonium salt form.

The additive chosen from the group consisting of: anionic polyacrylate polymer, anionic polyacrylate-polyacrylamide co-polymer, anionic maleic-acrylic acids copolymers, anionic acrylic acid-phosphonic acid copolymers and combinations thereof, preferably an anionic polyacrylate polymer.

In the present invention, when the additive is chosen in the group of additives comprising acrylate polymers or copolymers, it has advantageously a molecular weight of at least 20 000, preferably at least 30 000, more preferably at least 40 000. The additive has advantageously a molecular weight of at most 200 000, preferably at most 150 000, more preferably at most 120 000. In a particular embodiment of present invention the molecular weight of such additives is at least about 30 000 and at most about 120 000, preferably at least about 30 000 and at most about 100 000.

In the present invention, the quantity of the additive added in the first dissolution tank and the quantity of the additive added in the second dissolution tank are each separately at least 0.01, preferably at least 0.06, most preferably at least 0.12 g per kilogram of the crushed trona introduced in the first leaching tank. Advantageously the additives added in the first and second leaching tanks are the same. Generally the additive added in the first leaching tank is at least 10 w.%, preferably at least 20 w.%, more preferably at least 30 w.%, advantageously at most 90 w.%, more advantageously at most 70 w.%, and the quantity of the additive added in the second leaching tank is the complement to 100% of the total quantity of the additive added in the first and second leaching tanks. When more than two leaching tanks in cascade the gradation of the additive flow is preferably decreasing. For instance a process according the present invention with three leaching tanks with respective mean residence time of 10, 20, and 30 minutes may have advantageously respective additions of 50 w%, 35 w% and 15 w% of the total additive weight introduced in the process. Particular dosing of additives may be tuned by the person skilled in the art according the desired final production solid size particle distribution.

In a first embodiment of the present method the water is selected among the group consisting of natural water (such as filtered river water), rain water, phreatic waters, water from steam condensates, and combinations thereof.

In a second embodiment, the extraction water comprises sodium carbonate and/or sodium bicarbonate. Preferably the extraction water of step c) comprises at least 40, preferably at least 60, more preferably at least 80 g/kg of sodium bicarbonate; Generally in this second embodiment, the extraction water comprises at least 1, advantageously at least 5, more advantageously at least 10, even more advantageously at least 20, and even more advantageously at least 25 g/kg of sodium carbonate. Though if the concentration of the extraction water in sodium carbonate is too high, then the concentration of the dissolution solution present in the first leaching tank or in the subsequent leaching tank(s) may be higher than 180 g/kg. In such a case the crystallization domain in the corresponding leaching tanks are no more sodium bicarbonate but sodium sesquicarbonate (trona) or decemite (above 80° C.) that are the stable thermodynamic crystal phases for concentrations of sodium carbonate above 170-180 g/kg as can be seen in phases diagram disclosed in WO 2010072793 (FIG. 1). Therefore in such a case the concentration of the dissolution solution present in the first or in the subsequent leaching tank(s) will be saturated in sodium sesquicarbonate and the selective dissolution of sodium carbonate from trona will not operate in the leaching tank(s). Moreover it has been observed that when using an additive according the invention in the leaching tank(s), the dissolution solutions present in the leaching tank(s) may be supersaturated from 0.1 to 15 g/kg in sodium bicarbonate amplifying the risk to be placed out of the thermodynamic zone of sodium bicarbonate crystals as thermodynamic stable solid phase. Therefore in present invention it is recommended that the concentration in carbonate of the extraction water be less than 80 g/kg, advantageously at most 70 g/kg, more advantageously at most 60 g/kg, even more advantageously at most 50 g/kg. When sodium carbonate is present in the extraction water, in a recommended embodiment sodium carbonate concentration in the extraction water is 1 to 70 g/kg, or 1 to 60 g/kg, or 1 to 50 g/kg.

In a particularly advantageous embodiment of this second embodiment, the extraction water comprising sodium carbonate and/or sodium bicarbonate is obtained in a first step, in a pre-leaching tank from dissolution of trona ore with water or water comprising sodium carbonate and/or bicarbonate to form a suspension comprising nearly saturated in sodium bicarbonate or under saturated in sodium bicarbonate solution and trona insolubles, subsequently separating the trona insolubles from the nearly saturated in sodium bicarbonate or under saturated in sodium bicarbonate solution. It has been observed indeed that with such extraction waters at step c) the obtained solid in the leaching tanks and particularly the final production solid from step g) is a particularly coarse solid. More precisely in this particularly advantageous embodiment the process comprises before step c), the steps:

a. Dissolving crushed trona with an aqueous solution in a pre-leaching tank to obtain an extraction water undersaturated relatively to sodium bicarbonate and/or to sodium sesquicarbonate, preferably to obtain an extraction water saturated in sodium bicarbonate, along with trona insolubles and optionally undissolved crushed trona particles;

b. Separating the trona insolubles and optionally undissolved crushed trona particles from the extraction water to obtain an extraction water from which trona insolubles and optionally undissolved crushed trona particles have been separated and feeding the obtained extraction water to the first leaching tank from step c).

Advantageously in present process the produced solution comprises at least 100, preferably at least 120, more preferably at least 135 g/kg sodium carbonate. In present process the produced solution comprises generally at most 180, preferably at most 170 g/kg sodium carbonate.

In an advantageous embodiment to produce coarse solid particles in the leaching tank, the weight ratio of extraction water to sodium sesquicarbonate of the trona introduced in the leaching tank is less than 3.5, preferably less than 3.2. The weight ratio of extraction water to sodium sesquicarbonate of the trona introduced in the leaching tank has to be adjusted according the sodium sesquicarbonate content of the trona, such as the dissolution comprising sodium carbonate and sodium bicarbonate is saturated or super-saturated in sodium bicarbonate. To achieve a produced solution of at least 100, preferably at least 120, more preferably at least 135 g/kg sodium carbonate, a simple water balance calculation can be made by persons ordinary skilled in the art of soda ash production from trona to adjust extraction water quantity to adjust the sodium carbonate concentration, taking into account the sodium bicarbonate solubility diagram of the system: sodium carbonate, sodium bicarbonate, and water showed in FIG. 1 in the patent application WO 2010072793. The weight ratio of extraction water to sodium sesquicarbonate of the trona introduced in the leaching tank is generally at least 1.5, more generally at least 1.9, most generally at least 2.3.

Trona ore must be crushed down to a particle size suitable to get efficient dissolution of the trona in the dissolution solution. Crushing can for instance be performed in the trona mine, in the vicinity of the mining means or in the surface alkali plant. It is advantageously followed by sieving or any other separation means to eliminate too big or too small particles. Preferably in present invention, the crushed trona particles have a particles size less than a quarter of an inch. More preferably, crushed trona ore is composed of particles having a particles size distribution so that at least 90 weight % of the particles pass a 25 mesh, preferably a 50 mesh US ASTM E11 Tyler sieve. Advantageously the crushed trona particles have a mean diameter (D50) less than 5 mm. By diameter of trona particles is understood the equivalent diameter, that is the diameter of the sphere having the same surface as the particle. D50 is the diameter such that 50% by weight of the particles have a diameter less than D50. More preferably, the D50 diameter of the crushed trona particles is less than 2 mm. It is also recommended that the D50 diameter is at least 10 µm, preferably at least 20 µm.

In some preferred embodiments, the D50 is more preferably at least 35 µm, most preferably at least 50 µm. In order to speed up dissolution and get homogeneous solutions, it is important for the leaching tanks to be properly stirred. The stirring can be performed by any means known in the art suitable for inducing sufficient mixing to avoid the settling of the suspensions, in particular of the introduced crushed trona particles. Rotating stirrer means are preferred. In that case rotational speeds in excess of 50 rpm are recommended. Preferably the first and second leaching tanks are stirred leaching tanks with rotating stirrers, and the stirring speed of the second leaching tank is less than the stirring speed of the first leaching tank. This is particularly advantageous for the second and optional subsequent tanks with lower rotational stirring speed to decrease the attrition of the obtained solid particles comprising sodium bicarbonate, especially when long residence time are selected in the second and optional subsequent tanks.

In the process according to the invention, the dissolution solution is saturated or slightly super-saturated in sodium bicarbonate. Slightly super-saturated in sodium bicarbonate means in present document a concentration of sodium bicarbonate above 1 up to about 35 g/kg the value of the saturation value of the aqueous solution, comprising sodium carbonate, and given by the solubility diagram showed in FIG. 1 in the patent application WO 2010072793. When the process starts, it can happen that the solutions in the first and second leaching tanks are not yet saturated in sodium bicarbonate. In that case, when trona dissolves, it is necessary that the solution becomes as quickly as possible saturated in sodium bicarbonate, to start production of the solid particles. The concentration in sodium bicarbonate at saturation depends on the concentration of other components of the solution, mainly sodium carbonate, and on the temperature.

In the present process the temperature of the first suspension in the first leaching tank and/or the temperature of the second suspension in the second leaching tank is(are) at least 20° C., preferably at least 25° C., more preferably at least 30° C. and most preferably at least 40° C., advantageously at most 90° C., more advantageously at most 70° C., even more advantageously at most 60° C., and most advantageously at most 55° C. It is recommended for the temperature of the dissolution and production solutions to be at least 20° C., preferably at least 25° C., more preferably at least 30° C. and most preferably at least 40° C., to speed up dissolution, and increase sensitively the particles size of the produced particles.

Values of temperature of the dissolution and production solutions above 90° C. are not recommended because of excessive energy consumption. In this regard the temperature of the dissolution and production solutions is advantageously at most 70° C., more advantageously at most 60° C., and most advantageously at most 55° C.

If low sodium bicarbonate content in the production solution is desired, temperature values below 40° C. are preferred. For instance, values between 25 and 35° C. can be chosen, The production solid particles contain insoluble impurities and at least 65%, preferably at least 70%, more preferably at least 74%, most preferably at least 85% by weight sodium bicarbonate. They contain advantageously less than 15%, preferably less than 10%, most preferably less than 5% by weight of sodium carbonate.

The insoluble impurities coming from the trona ore, such as oil shales, dolomite, feldspar, quartz, clay and shortite, in contact with the production solution are released in the leaching tank, and part of them transformed into hydrated forms. These transformed insoluble particles will be called hereafter "trona insoluble impurities". They have interesting properties in combination with the high content of sodium bicarbonate of the production solid particles.

This is particularly the case when the production solid particles are used in treatment of a flue gas containing acid components. Such trona insoluble impurities present the benefit to inhibit the formation of incrustation in mills when the production solid particles are milled before to be introduced into the flue gas. Moreover specific pollutants of flue gases such as fluorhydric acid are effectively neutralized with such trona insoluble impurities in combination with sodium bicarbonate.

The solid particles obtained with the present process are of particularly coarse sizes. Therefore the present invention relates also to a solid particles powder comprising at least 70% by weight of sodium bicarbonate, and at least 2%, advantageously at least 5%, more advantageously at least 10% by weight of trona insoluble impurities, and at least 100 ppm of an additive selected from the group consisting of: anionic hexametaphosphate, anionic polyphosphate, anionic-polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers and combinations thereof and which mean particle size is at least 100 µm, preferably more at least 180 µm, more preferably at least 300 µm, and most preferred at least 400 µm.

The solid particles may contain at least 100 mg, more generally at least 200 mg, most generally at least 300 mg by weight of sodium polyacrylate or sodium polyacrylate-polyacrylamide co-polymer per kilogram of production solid particles. The solid particles may contain at most 800 mg, more generally at most 700 mg, most generally at most 600 mg by weight of sodium polyacrylate or sodium polyacrylate-polyacrylamide co-polymer thereof per kilogram of production solid particles. The solid particles contain essentially the sodium bicarbonate part of the trona ore introduced in the leaching tank, whereas the produced solution contains its sodium carbonate part. Without willing to be bound to any theory, as the trona comprising sodium sesquicarbonate does not have the same crystalline structure as sodium bicarbonate, it is believed that sodium sesquicarbonate from trona first dissolves to free sodium carbonate into the produced solution, and then sodium bicarbonate is concomitantly recrystallized partially on trona insolubles that act as seeding support to produce the solid particles. The solid particles are then separated from the production solution containing sodium carbonate. The separation can be done on any appropriate equipment. Without being limitative, the equipment can be chosen among: decanters, rotative filters, band filters, centrifuges and their combinations. The solid particles may be washed with fresh water to remove part of the production solution containing sodium carbonate. Such washing produces washing waters that can be recycled in the leaching tank.

In an advantageous embodiment of the present invention, the solid particles separated from the production solution are further dried. The drying of the solid particles can be realized on any appropriate equipment. Advantageously the drying is operated in a fluid bed, a rotary dryer, a flash pneumatic conveyor dryer, or a gravity dryer. The final temperature of the solid particles exiting the dryer should be low enough to avoid thermal decomposition of sodium bicarbonate into sodium carbonate. In an advantageous mode, the drying of the solid particles is operated with a $CO_2$ enriched atmosphere. This enables to transform part of the dissolved sodium carbonate, present in production solution and impregnating the solid particles, into sodium bicarbonate.

In one advantageous embodiment of the invention, the solid particles that are separated, and/or separated and dried, are further selected to constitute at least two size distribution fractions. Indeed the insoluble content and insoluble composition of the different particle sizes distribution may vary according the size. In the process according to the invention, the produced solution has a high content in sodium carbonate, which allows valorizing thoroughly the trona ore.

In another recommended embodiments, the produced solution comprises at least 120 g/kg, advantageously at least 135 g/kg, more advantageously at least 150 g/kg sodium carbonate. Generally at least 50 weight %, more generally at least 70 w. %, and most generally at least 80 w. % of the sodium carbonate is recovered from the separation of the solid particles from the leaching tank content.

Thanks to its high content in sodium carbonate, the produced solution can be used in many different applications.

In one embodiment, the process according present invention further comprises:
m. Optionally debicarbonating at least part of the production solution to obtain a partially debicarbonated production solution comprising sodium carbonate,
n. Crystallizing part of the sodium carbonate from the production solution comprising sodium carbonate from step g) or from the partially debicarbonated production solution from step m.: as sodium carbonate decahydrate or as sodium carbonate heptahydrate or as sodium carbonate monohydrate or as anhydrous sodium carbonate.

Advantageously, in this embodiment, part of the sodium carbonate from the production solution comprising sodium carbonate from step g) or from the partially debicarbonated production solution from step m. is crystallized as sodium carbonate monohydrate, and the sodium carbonate monohydrate is further dried in anhydrous soda ash. In such a case, it is recommended that the process according to the invention be coupled to an existing sodium carbonate monohydrate plant, to take advantage of existing monohydrate crystallizers.

In this one embodiment it is recommended that the produced solution be debicarbonated before crystallizing part of the sodium carbonate, in order to further lower its bicarbonate content. This debicarbonation can be performed thermally, for instance by vapor stripping removing part of carbon dioxide from the solution, or preferably through pH adjustment, for instance by sodium or calcium hydroxide addition, reacting with soluble sodium bicarbonate to transform it into sodium carbonate. Therefore in this embodiment of the process, the production solution at step m. is partly debicarbonated thermally or chemically by reaction with hydroxide ions.

The production solution at step m. may be also alternatively partly debicarbonated by: adding calcined trona comprising sodium carbonate to saturate the production solution in sodium sesquicarbonate and to precipitate sodium sesquicarbonate, and removing sodium sesquicarbonate to remove part of the bicarbonate from the production solution. The said sodium sesquicarbonate can be then further valorized as end product or be recycled into an existing trona calciner to be further processed into sodium carbonate.

In the one embodiment, it is also advantageous that the concentration in dissolved sodium carbonate of this part of the produced solution be further increased before being introduced into a crystallizer. This can be done by an addition of calcined trona, and then optionally the impurities are removed of the calcined trona.

In this option, it is recommended that the process according to the invention be coupled to an existing sodium carbonate monohydrate plant from calcined trona, to take advantage of existing equipments to remove the impurities of the calcined trona such as for instance: size classifiers, decanters, filters, active carbon treatment units, and combinations thereof before introducing the produced solution with increased content of sodium carbonate into the monohydrate crystallizer.

In a particular embodiment of the process according to the invention, at least part of the produced solution is introduced into compartments of an electrodialyzer comprising alternating less basic and more basic adjacent compartments separated from each other by cationic membranes, the more basic compartments being delimited by the anionic faces of bipolar membranes on one side and by the cationic membranes on the other side.

In this particular embodiment of the invention, the electrodialyzer contains at least two types of compartments and two types of membranes, cationic and bipolar. In some embodiments it can contain additional types of compartments and anionic membranes.

A bipolar membrane is an ion exchange membrane comprising one cationic face-permeable for the cations and impermeable for the anions and another anionic face-permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. It is recommended that the bipolar membranes are produced by the process as described in the patent application WO 01/79335 in the name of SOLVAY, in particular as described in its claims. The electrodialyzer comprises advantageously only two types of compartments and only cationic and bipolar membranes.

In a first variant of this particular embodiment the produced solution is introduced into the less basic compartments of the electrodialyzer. A solution comprising sodium bicarbonate is then extracted from those less basic compartments of the electrodialyzer, and is optionally cooled to produce a suspension comprising sodium bicarbonate crystals. The suspension may be then separated into valorized sodium bicarbonate crystals and sodium bicarbonate mother liquor.

In this first variant of this particular embodiment according to the invention, a first production solution comprising sodium carbonate is introduced into the less basic compartments of the electrodialyzer. Due to the flux of $Na^+$ ions through the cationic membrane, at least part of the entering sodium carbonate is transformed into sodium bicarbonate, forming an output solution comprising sodium bicarbonate. Depending on the concentration in sodium carbonate of the first production solution, it can also happen, in advantageous embodiments, that sodium bicarbonate is converted into carbon dioxide at the output of the less basic compartments of the cell. Indeed, when all the sodium carbonate entering the less basic compartments has been transformed into sodium bicarbonate as a consequence of $Na^+$ ions passing the cationic membranes, any additional flux of $Na^+$ ions passing through those membranes has the consequence of destroying sodium bicarbonate into $CO_2$ and water. The carbon dioxide can then be extracted from the cell and reacted with sodium carbonate solutions at other stages of the process in order to produce crystals of sodium bicarbonate. For instance, the generated $CO_2$ gas can advantageously be used to react with a sodium carbonate solution in order to produce sodium bicarbonate crystals. This reaction can be performed in gas—liquid contactors suitable for the carbonation of sodium carbonate solutions. Depending on the circumstances, the sodium carbonate solution can be first concentrated by any suitable means, before its carbonation.

In this first variant of this particular embodiment, if water is introduced into the more basic compartment, a solution comprising sodium hydroxide is then produced into the more basic compartments, by combination of the flux of sodium ions crossing the cationic membrane and the flux of hydroxyl ions crossing the anionic face of the bipolar membranes. This diluted solution of sodium hydroxide can be then used partly to debicarbonate for instance solutions from a soda ash plant or from a mine.

In a second variant of this particular embodiment, part of the production solution comprising sodium carbonate is further introduced in an electrodialysis process to debicarbonate part of the production solution. Advantageously in this second variant, part of the production solution comprising sodium carbonate and sodium bicarbonate is introduced into the more basic compartments of the electrodialyzer. The produced solution of the process according to the invention can advantageously be used to constitute this solution. A solution comprising sodium hydroxide is then produced into the more basic compartments, by combination of the flux of sodium ions crossing the cationic membrane and the flux of hydroxyl ions crossing the anionic face of the bipolar membranes. A solution enriched in sodium carbonate is finally extracted from the more basic compartments, thanks to the reaction of sodium bicarbonate with the sodium hydroxide, and can be further valorized.

Details and particularities of the invention will appear from the description of the following examples.

EXAMPLE 1

Not in Accordance with Present Invention

This is a reference example with additive added in only the first leaching tanks Two stirred borosilicate leaching tanks of 1.5 liters maximum useful volume each, double jacketed for temperature control, equipped each with a 6 pitched-blade stirrer, were used in series (cascade). Trona T200® produced by SOLVAY CHEMICALS, Inc. was used for all following examples.

A sodium polyacrylate ("NaPA")—ACRIFLOW 641S (WITTON Chem. Company) having a molecular weight of 30000-70000 g/mol, at initial 40 w % concentration—solution was prepared diluting it with deionized water at a concentration of 2.36 g/kg.

In this example, the extraction water used was deionized water. An extraction water/Trona weight ratio of 2.4 t/t was used for the comparative examples, and a temperature of 30° C. was controlled in each leaching tanks. The first leaching tank was first filed with extraction water and then trona, extraction water and sodium polyacrylate were fed to the first leaching tank at a flow respectively of about (+/−5%) 500 g/h, 1200 g/h, 15 ml/h corresponding to a quantity of 0.8 NaPA/kg of targeted precipitated sodium bicarbonate.

The corresponding mean residence times in the first and second leaching tanks of the suspensions were respectively 40 minutes (+/−5%) and 40 minutes each.

A continuous regime was established, and after 5 mean residence time duration of the trial, a sample of each leaching tanks were sampled. The production solid (outflow of second leaching tank) was separated from the production solution on a filter, the solid was washed with water and ethanol to remove the impregnating solution and the production solid was analyzed.

The solid particles size distribution was measured on a calibrated Malvern Mastersizer S Laser particle size analyzer, using a He—Ne Laser source at 632.8 nm, a focal length of 300 mm retro diffusion optical bench (300 RF), a liquid preparing cell (Malvern MS 17), and an automatic solvent filtration kit using ethanol saturated with sodium bicarbonate.

The obtained production solution had a sodium carbonate concentration of 133 g/kg and a sodium bicarbonate content of 61 g/kg (the first solution out of the first leaching tank had a sodium carbonate concentration of 131 g/kg and a sodium bicarbonate content of 65 g/kg).

The obtained produced solid, comprising mainly sodium bicarbonate and trona insolubles, was a very fine powder showing the following laser particle size distribution (on Malvern Mastersizer): $d10=2$ μm, $d50=13$ μm, $d90=42$ μm. The first solid particles from first leaching tank treated in the same way as the production solid out of the second leaching tank showed similar particle size distribution with respectively $d10=2$ μm, $d50=15$ μm, $d90=44$ μm).

EXAMPLE 2

Not in Accordance with Present Invention

The same test was performed as Example 1 with same extraction water/trona ratio, and same total additive amount (NaPA) of 0.8 g NaPA/kg of targeted precipitated sodium bicarbonate, with the following operating conditions changes:

mean residence time of first leaching tank: 10 minutes, second leaching tank: 15 minutes.

After 5 residence time renewals of the leaching tanks for establishing a continuous regime each tank was sampled and the suspensions treated as example 1.

The obtained production solution had a sodium carbonate concentration of 130 g/kg and a sodium bicarbonate content of 66 g/kg (the first solution out of the first leaching tank had a sodium carbonate concentration of 126 g/kg and a sodium bicarbonate content of 81 g/kg).

The obtained produced solid, comprising mainly sodium bicarbonate and trona insolubles, was still a fine powder showing the following laser particle size distribution (on Malvern Mastersizer): d10=1 µm, d50=21 µm, d90=260 µm.

EXAMPLE 3

In Accordance with Present Invention

Same test was performed as Example 2 (with same extraction water/trona ratio and same respective residence time of respectively 10 and 15 minutes) but with the following operating conditions changes:
the additive, added at the same quantity as the one of examples 1 and 2, was fractioned in two flows: 50 w % introduced in leaching tank 1 (0.4 g NaPA/kg of targeted precipitated sodium bicarbonate), and 50 w % introduced in leaching 2 (0.4 g NaPA/kg of targeted precipitated sodium bicarbonate).

After 5 residence time renewals of the leaching tanks for establishing a continuous regime each tank was sampled and the suspensions treated in the same way as example 1.

The obtained production solution had a sodium carbonate concentration of 134 g/kg and a sodium bicarbonate content of 74 g/kg (the first solution out of the first leaching tank had a sodium carbonate concentration of 135 g/kg and a sodium bicarbonate content of 73 g/kg).

The obtained produced solid, comprising mainly sodium bicarbonate and trona insolubles, was a coarser powder showing the following laser particle size distribution (on Malvern Mastersizer): d10=4 µm, d50=104 µm, d90=460 µm. This shows the strong benefit to fractioned the additive addition in both leaching tank.

EXAMPLE 4

In Accordance with Present Invention

Same test was performed as Example 3 (with same extraction water/trona ratio and same respective residence time of respectively 10 and 15 minutes, and same additive, added at the same quantity as the one of examples 1 and 2, was fractioned in two flows: 50 w % in each leaching tank) but with the following operating conditions changes:
the extraction water was replaced by an aqueous solution comprising 84 g/kg of sodium bicarbonate and 24 g/kg of sodium carbonate sodium carbonate (almost saturated in sodium bicarbonate at 30° C.).

After 5 residence time renewals of the leaching tanks for establishing a continuous regime each tank was sampled and the suspensions treated in the same way as example 1.
The obtained produced solid, comprising mainly sodium bicarbonate and trona insolubles, was a very coarse powder showing the following laser particle size distribution (on Malvern Mastersizer): d10=12 µm, d50=420 µm, d90=696 µm. The first solid particles from first leaching tank treated in the same way as the production solid out of the second leaching tank showed similar particle size distribution with respectively d10=9 µm, d50=256 µm, d90=500 µm). This shows the strong benefit to fractioned the additive addition in both leaching tank and also using an extraction water almost saturated in sodium bicarbonate.

Should the disclosure of any patent, patent applications, and publications that are incorporated herein by reference conflict with the present description to the extent that it might render a term unclear, the present description shall take precedence.

The invention claimed is:
1. A process for producing sodium carbonate and sodium bicarbonate in a continuous mode from trona, comprising the following steps:
c. feeding crushed trona, extraction water and an additive in a first leaching tank containing a dissolution solution comprising sodium carbonate and sodium bicarbonate, saturated or super-saturated in sodium bicarbonate, wherein the additive is selected from the group consisting of: anionic hexametaphosphate, anionic polyphosphate, anionic polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers, and combinations thereof;
d. dissolving at least partially the crushed trona in the dissolution solution in order to produce a first suspension comprising solid particles comprising sodium bicarbonate and a first solution comprising sodium carbonate;
e. removing continuously the first suspension from the first leaching tank to obtain a removed first suspension, and feeding the removed first suspension and an additive into a second leaching tank, wherein the additive fed to the second leaching tank is the same or different than the additive fed to the first leaching tank, and wherein the additive fed to the second leaching tank is selected from the group consisting of: anionic hexametaphosphate, anionic polyphosphate, anionic polyphosphonate, soja lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers, and combinations thereof;
f. dissolving at least partially the crushed trona remaining in the removed first suspension from step e) in the dissolution solution present in the second leaching tank in order to produce a second suspension comprising second solid particles comprising sodium bicarbonate and a second solution comprising sodium carbonate; and
g. separating the second solid particles from the second solution to produce a production solution comprising sodium carbonate and to produce a production solid comprising the second solid particles, said second solid particles comprising sodium bicarbonate.
2. The process according to claim 1, wherein the additive fed in step c), or fed in step e), or fed in both steps c) and e) is selected from the group consisting of: anionic polyacrylate polymer, anionic polyacrylate-polyacrylamide co-polymer, anionic maleic-acrylic acids copolymers, anionic acrylic acid-phosphonic acid copolymers and combinations thereof.

3. The process according to claim 2, wherein the additive has a molecular weight of at least 20,000.

4. The process according to claim 1, wherein the quantity of the additive added in the first leaching tank and the quantity of the additive added in the second leaching tank are each separately at least 0.01g per kilogram of the crushed trona introduced in the first leaching tank.

5. The process according to claim 1, wherein the additives added in the first and second leaching tanks are the same; wherein the proportion of the additive added in the first leaching tank is from 10% by weight to 90% by weight based on the total quantity of the additive added in the first and the second leaching tanks, and wherein the quantity of the additive added in the second leaching tank is the complement to 100% by weight of the total quantity of the additive added in the first and the second leaching tanks.

6. The process according to claim 1, wherein the mean residence time of the first suspension in the first leaching tank is from 10 seconds to 30 minutes.

7. The process according to claim 1, wherein the crushed trona particles have a particle size less than a quarter of an inch.

8. The process according to claim 1, wherein at least one of the temperature of the first suspension in the first leaching tank and the temperature of the second suspension in the second leaching tank is from 20° C. to 90° C.

9. The process according to claim 1, wherein the first and second leaching tanks are stirred leaching tanks, and wherein the stirring speed of the second leaching tank is less than the stirring speed of the first leaching tank.

10. The process according to claim 1, wherein the production solution comprises at least 100 g/kg sodium carbonate.

11. The process according to claim 1, wherein the production solution comprises at most 180 g/kg sodium carbonate.

12. The process according to claim 1, wherein the production solid comprising the second solid particles from step (g) is further dried.

13. The process according to claim 1, wherein the production solid contains at least 70% by weight sodium bicarbonate.

14. The process according to claim 1, wherein the extraction water of step c) comprises 1 to 70 g/kg of sodium carbonate.

15. The process according to claim 1, further comprising before step c), the steps:
 a. dissolving crushed trona with an aqueous solution in a pre-leaching tank to obtain extraction water undersaturated relative to sodium bicarbonate and/or to sodium sesquicarbonate, along with trona insolubles and optionally undissolved crushed trona particles; and
 b. separating the trona insolubles and optionally undissolved crushed trona particles from the extraction water to obtain extraction water from which trona insolubles and optionally undissolved crushed trona particles have been separated and feeding the obtained extraction water to the first leaching tank from step c).

16. The process according to claim 1, further comprising:
 optionally debicarbonating at least part of the production solution to obtain a partially debicarbonated production solution comprising sodium carbonate, and
 crystallizing part of the sodium carbonate from the production solution comprising sodium carbonate from step g) or from the partially debicarbonated production solution from step m), as sodium carbonate decahydrate or as sodium carbonate heptahydrate or as sodium carbonate monohydrate or as anhydrous sodium carbonate.

17. The process according to claim 16, wherein the production solution at step m) is partly debicarbonated by: adding calcined trona comprising sodium carbonate to saturate the production solution in sodium sesquicarbonate and to precipitate sodium sesquicarbonate, and removing sodium sesquicarbonate to remove part of the bicarbonate from the production solution.

18. The process according to the claim 16, wherein the production solution at step m) is partly debicarbonated thermally or chemically by reaction with hydroxide ions.

19. The process according to claim 1, wherein part of the production solution comprising sodium carbonate is further introduced in an electrodialysis process to debicarbonate part of the production solution.

20. The process according to claim 1, wherein part of the production solution is introduced into less basic compartments of an electrodialyzer, and wherein a solution comprising sodium bicarbonate is then extracted from the less basic compartments of the electrodialyzer, and is optionally cooled to produce a suspension comprising sodium bicarbonate crystals.

21. A solid particles powder comprising at least 70% by weight of sodium bicarbonate, at least 2% by weight of trona insoluble impurities, and at least 100 ppm of an additive selected from the group consisting of: anionic hexametaphosphate, anionic polyphosphate, anionic-polyphosphonate, soj a lecithine, anionic polycarboxylate polymer, anionic polyacrylate polymer, anionic polyacrylate-polyacrylamide co-polymer, anionic hydrolyzed polymaleic polymers, anionic maleic-acrylic acids copolymers, anionic acrylic acid-phosphonic acid copolymers and combinations thereof, wherein particles in said powder have a mean particle size of at least 100 μm.

* * * * *